US005221408A

United States Patent [19]

Haider

[11] Patent Number: 5,221,408

[45] Date of Patent: Jun. 22, 1993

[54] APPLICATOR FOR APPLYING A LABEL HAVING A HEAT ACTIVATED ADHESIVE TO AN OBJECT HAVING AN ELEVATED TEMPERATURE

[75] Inventor: Lawrence J. Haider, Hastings, Minn.

[73] Assignee: Minnesota Mining and Manufacturing Company, St. Paul, Minn.

[21] Appl. No.: 976,493

[22] Filed: Nov. 13, 1992

[51] Int. Cl.$^5$ .............................................. B32B 31/00

[52] U.S. Cl. .................................... 156/579; 156/523; 156/576

[58] Field of Search ............... 156/523, 524, 579, 582, 156/574, 476; 7/105

[56] References Cited

U.S. PATENT DOCUMENTS

| | | | |
|---|---|---|---|
| 4,072,547 | 2/1978 | Pavnica | 156/576 X |
| 4,261,788 | 4/1981 | McClung | 156/541 |
| 4,490,198 | 12/1984 | Mitchell | 156/71 |
| 4,612,078 | 9/1986 | Karp | 156/493 |
| 4,729,587 | 3/1988 | Ward | 294/19.1 |
| 4,854,625 | 8/1989 | Eubanks et al. | 294/19.1 |
| 4,915,994 | 4/1990 | Begelfer et al. | 428/40 |
| 4,929,112 | 5/1990 | Wilcox | 403/93 |
| 4,961,661 | 10/1990 | Sutton et al. | 401/6 |
| 5,014,384 | 5/1991 | Brezette et al. | 15/230.11 |
| 5,050,261 | 9/1991 | Hofacker | 15/144 |
| 5,069,610 | 12/1991 | Milburn | 425/87 |
| 5,099,539 | 3/1992 | Forester | 15/143 |
| 5,105,500 | 4/1992 | Bordogna | 15/230.11 |

*Primary Examiner*—David A. Simmons
*Assistant Examiner*—James J. Engel, Jr.
*Attorney, Agent, or Firm*—Gary L. Griswold; Walter N. Kirn; Leland D. Schultz

[57] ABSTRACT

Disclosed is an applicator for applying a label having a heat activated adhesive coating to an object having an elevated temperature.

6 Claims, 3 Drawing Sheets

APPLICATOR FOR APPLYING A LABEL HAVING A HEAT ACTIVATED ADHESIVE TO AN OBJECT HAVING AN ELEVATED TEMPERATURE

FIELD OF THE INVENTION

This invention relates generally to applicator for applying labels to an object.

BACKGROUND OF THE INVENTION

Sheets of metal are commonly made by rolling a slab, several inches in thickness, between progressively closer spaced rolls to reduce its thickness. Typically, the sheets are then rolled into a coil for storage and handling. This process is generally done at elevated temperature with said temperature dependent upon the metal alloy composition. For instance, a coil of steel 51 inches wide by 3/16 inches thick by 200 feet may initially be at an elevated temperature of approximately 1400° F. Multiple coils of metal are generally produced and then stored until sufficiently cooled for subsequent handling and processing, which may require 48 hours or more.

It is desirable to individually identify the coils of metal during this period and later, for inventory purposes and to record the composition of the metal. In the past, it is known to use a piece of chalk or like marker and to apply identifying indicia to the exterior and/or interior of the coil. This process is inconvenient and potentially unsafe due to elevated temperature of the coil and the necessity to approach closely enough to apply the indicia. Frequently, it is difficult to consistently apply indicia that are unambiguous or even legible. Indicia applied to the exterior of the coil may be rubbed off or other wise obscured or degraded. Further, such markings are not machine readable (i.e. bar coded).

It is also known to use a pre-printed label with indicia having a heat activated adhesive to be applied to the exterior of a coil of metal at an elevated temperature. Such labels have been applied with a tool that may be manually grasped and presents a surface for holding the label that approximates the curvature of the coil. A label may be placed on the curved surface with the heat activated adhesive presented for contact with the exterior surface of the coil. However, this approach is also undesirable in that when the label is applied to the coil and pressed down, a portion of the heat activated adhesive is squeezed out from underneath the label, rendering adherence of the label to the roll unreliable. Another consideration is that it is frequently desirable to place indicia in locations that are less exposed to damage, but consequently less convenient to place.

Therefore, it is desirable to provide an applicator for reliably and conveniently applying a heat activated adhesive label to an object having an elevated temperature.

SUMMARY OF THE INVENTION

The present invention is an applicator for applying a label having a surface with a heat activated adhesive coating to an object having an elevated temperature. The applicator includes a handle member having a first end adapted for manual engagement and manipulation. Means for releasably gripping one of the labels is mounted on the handle member adjacent a second end thereof. Remote actuation means are provided for releasing the label from the gripping means when positioned over the object having an elevated temperature, so that the heat activated adhesive coating contacts the object. A roller is also provided having a heat resistant outer surface rotatively mounted on a second end of the handle member. The roller is for compressive rolling contact with the label to bond the label to the object having an elevated temperature.

In the preferred embodiment of the invention, the roller includes a cylindrical core rotatively mounted on the handle member and a heat resistant cover layer positioned around the core. The roller may further include a resilient layer interposed between the rigid core of the roller and the heat resistant cover layer.

Preferably, the gripping means includes a clip adapted to grip one of the labels, mounted on the handle member and is resiliently biased to a closed position and the remote actuation means includes a cable connected at one end to the clip and at another end to the handle member adjacent the first end thereof, wherein the cable may be retracted to open said clip and release one of the labels.

BRIEF DESCRIPTION OF THE DRAWINGS

The present invention will be more thoroughly described with reference to the accompanying drawing in which like numbers refer to like parts in the several views, and wherein.

DETAILED DESCRIPTION OF THE INVENTION

Figures 1, 2:
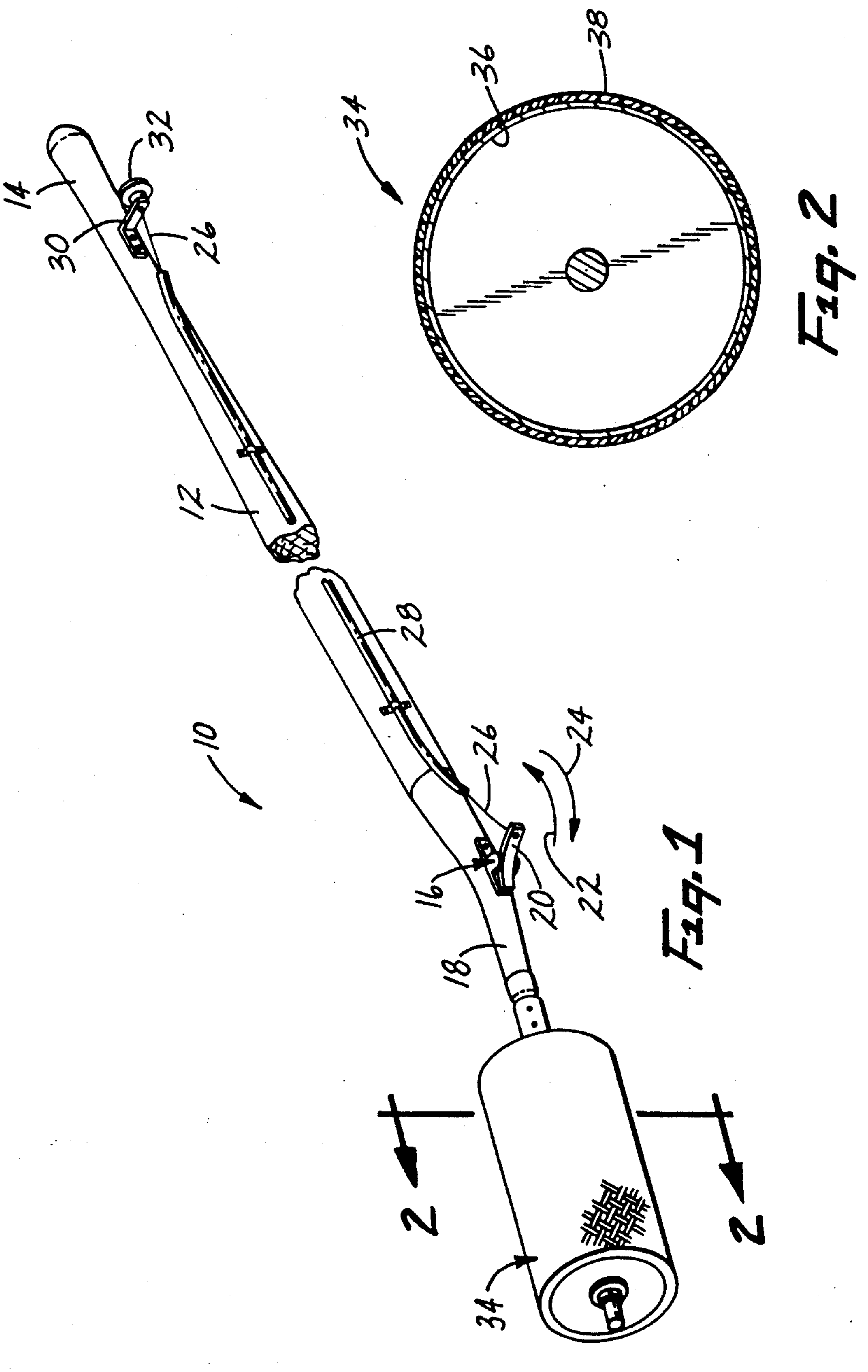
FIG. 1 is an isometric view of an applicator according to the present invention.
FIG. 2 is a cross-sectional view along plane 2—2 of the applicator of FIG. 1.

Referring now to FIG. 1, there is shown an applicator 10 according to the present invention. Applicator 10 includes handle member 12 adapted for manual engagement and manipulation at first end 14. Means are provided to releasably grip a label (not shown in FIG. 1) having a heat activated adhesive. The label contains indicia (not shown) on its exterior surface for identifying the individual coil and its composition and may include preprinted machine readable indicia (e.g. bar coding). A label that may be used in conjunction with the present invention is disclosed in co-pending U.S. patent application Ser. No. 07/927,821, filed Aug. 10, 1992 and entitled "High Temperature Label", the contents of which are incorporated herein.

Figure 6:
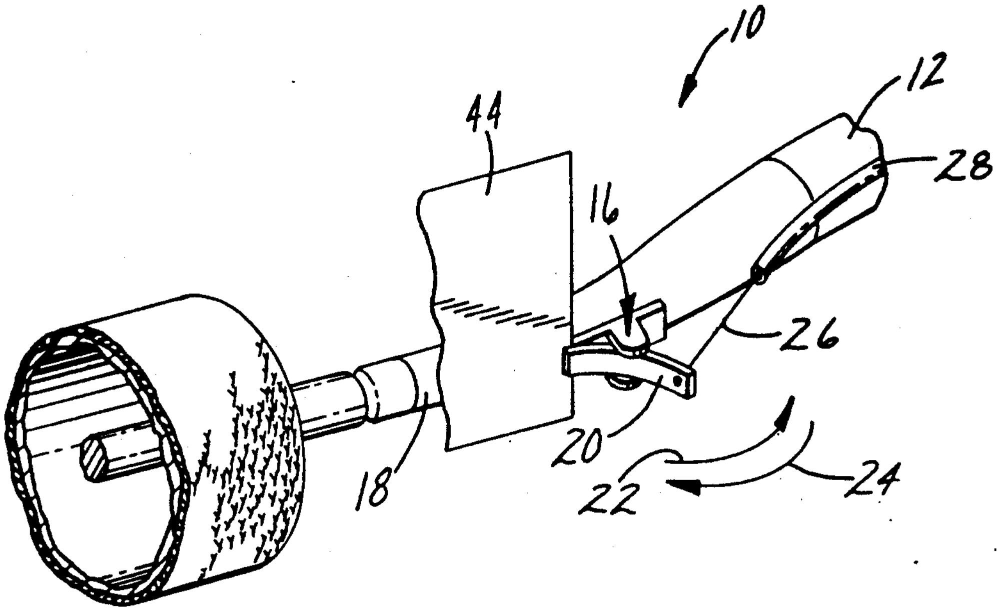
FIG. 6 is a magnified isometric view of a portion of the applicator of FIG. 1.

In the illustrated embodiment, also shown in FIG. 6, the gripping means takes the form of clip 16 mounted on handle member 12 adjacent the second end 18 thereof. Any suitable clip or clamp may be used and preferably a clip that is resiliently biased (such as by a spring, not shown), to a closed or gripping position. When the handle 20 of the clip is rotated in direction 22 against the force of the biasing spring, an object, such as the label, may be inserted and the handle 20 allowed to return to its original position in direction 24 and the label is then securely gripped by the clip.

Means are also provided to remotely actuate the clip. In the illustrated embodiment, the remote actuation means takes the form of cable 26 attached at one end to handle 20 of the clip 16. The cable extends towards first end 14 of the handle member 12. In the illustrated embodiment, cable 26 is constrained by tube 28 mounted on the handle 12 and extending along side therewith.

Flange 30 is mounted on handle member 12 adjacent the first end 14 thereof. Cable 26 extends through an aperture (not shown) in the flange and is secured by nut 32 or the like. Depressing the cable 26 adjacent flange 30 will cause clip 16 to open at second end of the handle member, and releasing the cable will cause the clip to close again.

Roller 34 is rotatively mounted on the second end of handle member 12. The roller includes an outer surface that is resistant to elevated temperatures that may be encountered in applying the labels, yet applies an even force when in rolling compressive contact with a label.

FIG. 2 illustrates in cross-section one embodiment of the roller 34. Core 36 is provided in the form of a light weight, yet rigid tube, such as may be preferably constructed out of aluminum, such a roll having a three inch outer diameter and a 0.060 inch wall thickness.

Cover layer 38 is constructed of a heat resistant material. In the preferred embodiment of the invention, the cover is constructed of woven fibers formed from a blend of aluminum, boria and silica having a thickness of 45 mils (0.045 inch) and a basis weight of 1.7 pounds per square yard available from Minnesota Mining and Manufacturing Company of St. Paul, Minnesota under the trademark "Nextel TM 440 BF-10".

Figure 3:
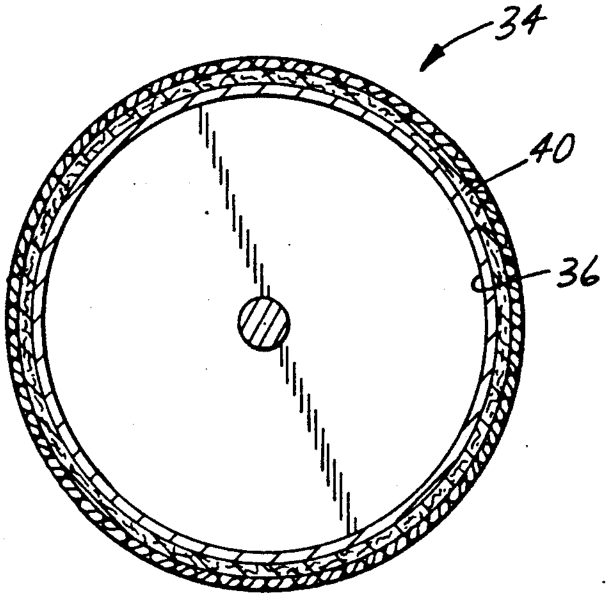
FIG. 3 is a cross-sectional view of an alternate embodiment of the applicator of FIG. 1.

FIG. 3 illustrates an alternate embodiment of roller 34 including core 36 and cover layer 38, as in FIG. 2, with additional resilient compressive layer 40 interposed therebetween. This arrangement provides a more uniform and compressive force when the roller is applied to the label, as hereinafter described. One material that may be used is available from BGF Industries, Inc., of Greensboro, North Carolina under the trademark "Fiber-Frok".

In both FIGS. 2 and 3, the cover layer 38 and compressive layer 40 may be adhered to each other and to core 36 by a high temperature resistant adhesive such as a silicone adhesive available from Cling-surface Co. of Angola, New York, under the trademark "Cling'N-'Seal."

Figure 4:
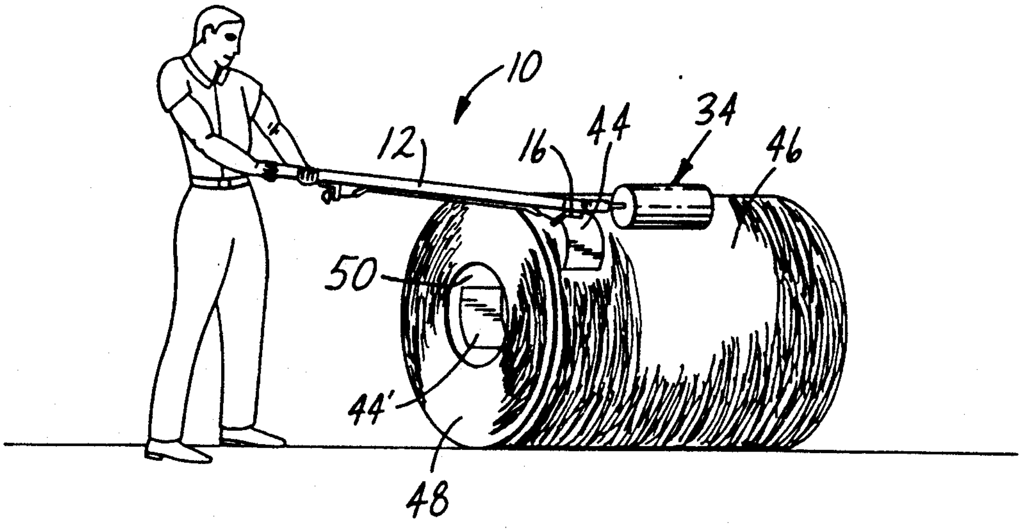
FIG. 4 is a front view of the applicator of FIG. 1 being used to apply a label to an object having an elevated temperature.
Figure 5:
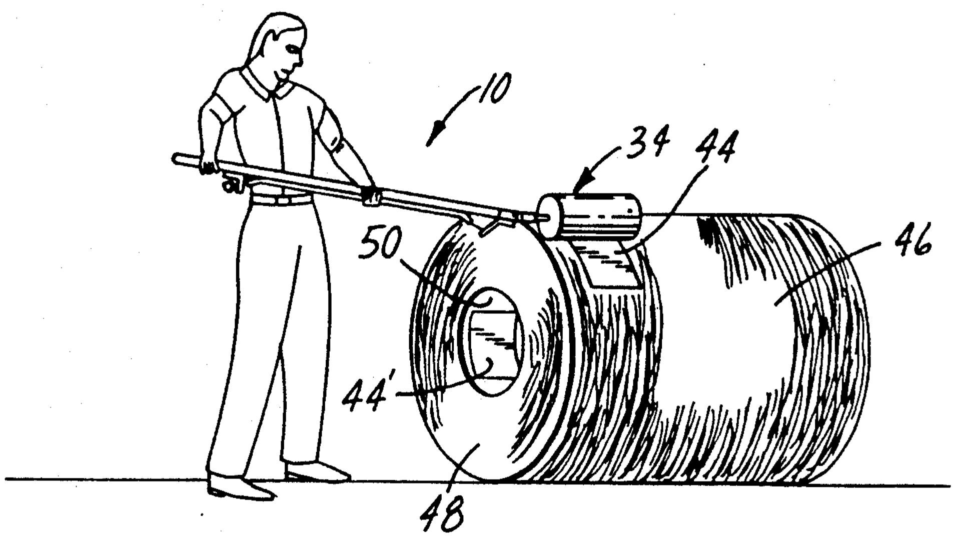
FIG. 5 is front view of the applicator of FIG. 4 being used to roll down a label on an object having an elevated temperature.

FIG. 4 shows the application of a label 44 being applied to the exterior 46 of coil 48. Handle member 12 may be selected with a length sufficient to space the operator a comfortable distance from the coil having an elevated temperature. Once the label is located in a desired position, the clip 16 is actuated by depressing cable 26 and the label is released and the adhesive coated side thereof contacts coil 48. The heat activated adhesive immediately secures the label to the coil. However, it is preferred to "roll down" the label by reciprocally applying the roller 34 in compressive rolling contact with the label, as shown in FIG. 5. This approach reduces or eliminates the tendency for the activated adhesive to be squeezed from underneath the label.

Also shown on FIGS. 4 and 5 is label 44' which has been applied to interior surface 50 of coil 46. It may be desirable to mount the roller with its axis of rotation inclined with respect to handle member 12 (as shown) to facilitate the application and roll down of labels to either the exterior or interior of an object having an elevated temperature. The present invention thus offers the advantage of being able to apply a label with a heat activated adhesive to an interior surface of an object. This is advantageous in that it is less likely that the label will be damaged or dislodged, as compared to a label applied to an exterior surface. In all respects, the use and operation of the present invention remains the same to applying labels to interior surfaces as exterior surfaces.

It is to be understood that even though numerous characteristics and advantages of the present invention have been set forth in the foregoing description, together with the details of the steps and structure of the invention, the disclosure is illustrative only, and changes may be made in detail, within the principles of the invention to the full extent indicated by the broad general meaning of the terms in which the appendant claims are expressed.

What is claimed is:

1. An applicator for applying a label having a surface with a heat activated adhesive coating to an object having an elevated temperature, comprising:

(a) a handle member having a first end adapted for manual engagement and manipulation;

(b) gripping means mounted on said handle member adjacent a second end thereof, for releasably gripping one of the labels having a heat activated adhesive coating;

(c) remote actuation means for releasing the label from said gripping means when positioned over the object having an elevated temperature, so that the heat activated adhesive coating contacts the object; and (d) a roller having a heat resistant outer surface rotatively mounted on said second end of said handle member, said roller for compressive rolling contact with the label to bond the label to the object having an elevated temperature.

2. The applicator of claim 1, wherein said roller includes a cylindrical core rotatively mounted on said handle member and a heat resistant cover layer positioned around said core.

3. The applicator of claim 2, further including a compressive resilient layer interposed between said core of said roller and said heat resistant cover layer.

4. The applicator of claim 1, wherein said gripping means includes a clip mounted on said handle member and resiliently biased to a closed position and adapted to grip one of the labels.

5. The applicator of claim 4, wherein said remote actuation means includes a cable connected at one end to said clip and at another end to said handle member adjacent said first end thereof, wherein said cable may be activated to open said clip and release one of the labels.

6. The applicator of claim 1, wherein the axis of rotation of said roller is inclined with respect to said handle member.

* * * * *